US012752648B2

(12) United States Patent
Liu

(10) Patent No.: US 12,752,648 B2
(45) Date of Patent: Oct. 6, 2026

(54) CHARGING PILE WITH ADJUSTABLE CHARGING CABLE

(71) Applicant: BRAVOLED INDUSTRIAL COMPANY LIMITED, Shenzhen (CN)

(72) Inventor: Ziang Liu, Shenzhen (CN)

(73) Assignee: BRAVOLED INDUSTRIAL COMPANY LIMITED, Shenzhen (CN)

( * ) Notice: Subject to any disclaimer, the term of this patent is extended or adjusted under 35 U.S.C. 154(b) by 642 days.

(21) Appl. No.: 18/451,854

(22) Filed: Aug. 18, 2023

(65) Prior Publication Data

US 2024/0166064 A1 May 23, 2024

Related U.S. Application Data

(63) Continuation of application No. PCT/CN2022/137755, filed on Dec. 9, 2022.

(30) Foreign Application Priority Data

Nov. 22, 2022 (CN) ......................... 202211465464.0

(51) Int. Cl.
*H02J 7/00* (2026.01)
*B60L 53/18* (2019.01)

(52) U.S. Cl.
CPC .................................... *B60L 53/18* (2019.02)

(58) Field of Classification Search
USPC .......................................................... 320/109
See application file for complete search history.

(56) References Cited

U.S. PATENT DOCUMENTS

2016/0121747 A1* 5/2016 Jefferies .................. B60L 53/16 320/109
2017/0129355 A1* 5/2017 Fournier ................... H02J 7/00

FOREIGN PATENT DOCUMENTS

| | | | |
|---|---|---|---|
| CN | 207957424 | U | 10/2018 |
| CN | 108909516 | A | 11/2018 |
| CN | 208931151 | U | 6/2019 |
| CN | 208978643 | U | 6/2019 |
| CN | 210258079 | U | 4/2020 |

(Continued)

OTHER PUBLICATIONS

Machine Translation of DE102019104132A1 (Year: 2020).*

(Continued)

*Primary Examiner* — Samuel Berhanu

(57) ABSTRACT

Disclosed is a charging pile with an adjustable charging cable, including a charging pile body, a charging cable, a charging gun, and a cable adjusting device, where the charging pile body is provided with a cable outlet; a first end of the charging cable is connected to the charging pile body, a second end of the charging cable penetrates the cable outlet, and the charging cable can stretch out or retract through the cable outlet; the charging gun is connected to the second end of the charging cable; and the cable adjusting device is configured for eliminating the torsional force of the charging cable. The charging cable can rotate to generate a torsional force, and the cable adjusting device rotates along with the charging cable, so that the torsional force is eliminated, friction is reduced, the charging cable is protected, and the service life and the safety are enhanced.

8 Claims, 11 Drawing Sheets

(56) References Cited

FOREIGN PATENT DOCUMENTS

| | | | |
|---|---|---|---|
| CN | 210478440 | U | 5/2020 |
| CN | 113336020 | A | 9/2021 |
| CN | 214267385 | U | 9/2021 |
| DE | 102019104110 | A1 | 8/2020 |
| DE | 102019104132 | A1 | 8/2020 |
| EP | 3312044 | A1 | 4/2018 |

OTHER PUBLICATIONS

International Search Report issued in corresponding International application No. PCT/CN2022/137755, mailed Mar. 20, 2023.

Written Opinion of the International Search Authority in corresponding International application No. PCT/CN2022/137755, mailed Mar. 20, 2023.

* cited by examiner

CHARGING PILE WITH ADJUSTABLE CHARGING CABLE

TECHNICAL FIELD

The present invention relates to the technical field of automobile charging piles, and particularly relates to a charging pile with an adjustable charging cable.

BACKGROUND

In recent years, with the booming development of the new energy vehicle industry, more and more people begin to purchase and drive new energy vehicles, and the number of new energy vehicles is increasing year by year. In particular, electric vehicles, due to increasingly mature technology, safety and reliability, are preferred by people. At the same time, people are using charging piles more and more frequently to charge electric vehicles.

However, existing charging piles have many problems. For example, some charging piles cannot automatically bundle cables, thus resulting in cable pollution or wear, and affecting the use of users; although some charging piles can automatically bundle cables, the cables will be rubbed repeatedly during use, which will easily damage the cables, affect the service life of the charging piles, and endanger the safety of users.

Therefore, the present invention provides a charging pile with an adjustable charging cable, to solve the above problems. The charging pile has a simple structure, and is capable to automatically bundle cables and reduce friction caused by cable rotation, thus prolonging the service life of the product.

SUMMARY

Therefore, the present invention provides a charging pile with an adjustable charging cable, to overcome the defects in the prior art. The charging pile has a simple structure, and is capable to automatically bundle cables and reduce friction caused by cable rotation, thus prolonging the service life of the product.

A technical solution adopted by the present invention to solve the above technical problem is as follows:

- a charging pile with an adjustable charging cable, including:
- a charging pile body, which is provided with a cable outlet;
- a charging cable, where a first end of the charging cable is connected to the charging pile body, a second end of the charging cable penetrates the cable outlet, and the charging cable can stretch out or retract through the cable outlet;
- a charging gun, which is connected to the second end of the charging cable; and
- a cable adjusting device, where the cable adjusting device is arranged at the cable outlet, and when the charging cable stretches out or retracts through the cable outlet, the cable adjusting device is configured for eliminating the torsional force of the charging cable.

As an improvement of the present invention, the cable adjusting device includes a first rotating member and a bearing, where the bearing is sleeved on the first rotating member, the inner wall of the cable outlet is provided with a containing groove, and the outer disc of the bearing is arranged in the containing groove.

As an improvement of the present invention, the cable adjusting device further includes a snap ring, the outer surface of the first rotating member is provided with a boss and a slot, the snap ring is snapped into the slot, when the bearing is sleeved on the first rotating member, the boss abuts against the upper surface of the bearing, and the snap ring abuts against the lower surface of the bearing.

As an improvement of the present invention, the cable adjusting device further includes a second rotating member, the second rotating member is connected to the first rotating member, and the edge of the second rotating member is slidably abutted against the edge of the cable outlet.

As an improvement of the present invention, the second rotating member is provided with a containing channel, the inner wall of the containing channel is provided with a containing groove, and the containing groove is configured for containing the first rotating member.

As an improvement of the present invention, a counterweight slider is further included, the counterweight slider is sleeved on the charging cable, and slides along the surface of the charging cable, and there exists a distance between the counterweight slider and the ground.

As an improvement of the present invention, the counterweight slider includes a first counterweight, a second counterweight, and a connecting member, where one end of the connecting member is connected to the first counterweight, and the other end of the connecting member is connected to the second counterweight, so that the first counterweight is connected to the second counterweight to form a counterweight ring.

As an improvement of the present invention, the counterweight slider is a counterweight ring, the inner surface of the counterweight ring is provided with a smooth sliding surface, and the sliding surface is engaged with the charging cable.

As an improvement of the present invention, a wiring channel is provided in the charging pile body, the wiring channel is communicated with the cable outlet, and the wiring channel is configured to allow the charging cable to pass through.

As an improvement of the present invention, the wiring channel has a plurality of arc-shaped channels, and the charging cable extends along the arc-shaped channels, so that the multi-layer charging cable is repeatedly wound and passes through the inner ring of the counterweight ring.

As an improvement of the present invention, a limiting member is further included, the limiting member protrudes from the surface of the charging cable, and when the charging cable is retracted to the initial position along the cable outlet, the limiting member abuts against the second rotating member.

As an improvement of the present invention, the containing channel is provided with an inclined first abutment surface, the limiting member is provided with an inclined second abutment surface, and when the charging cable is retracted to the initial position along the cable outlet, the second abutment surface abuts against the first abutment surface.

As an improvement of the present invention, a charging gun storage device is further included, the charging gun storage device is provided with an insertion port, and the charging gun is detachably inserted into the insertion port.

As an improvement of the present invention, a clamping block is arranged in the insertion port, the surface of the charging gun is provided with a clamping slot, and when the charging gun is inserted into the insertion port, the clamping block is snapped into the clamping slot.

The present invention has the beneficial effects as follows: through the setting of the above structure, an electric vehicle can be charged after picking up the charging gun, pulling the charging cable and inserting the charging gun into the charging port of the electric vehicle; however, when the charging cable is pulled, the impact on the charging cable is not uniform along the axial direction of the charging cable, so under normal circumstances, when the charging cable is pulled, the charging cable usually will be twisted along the circumferential direction, so that a torsional force is generated; after charging, the charging cable is retracted along the cable outlet, and the charging gun is relocated to the charging gun storage device, which can effectively store and rearrange the charging cable and ensure the stability of the product; and when the charging cable is stretched out or retracted through the cable outlet, the charging cable will rotate along the circumferential direction in most cases to generate a torsional force, and the cable adjusting device is arranged at the cable outlet, and is capable to rotate as the charging cable rotates along the circumferential direction, so that the torsional force of the charging cable is eliminated, the friction between the charging cable and the cable outlet is reduced, the charging cable is effectively protected, and the service life and safety of the product are enhanced.

BRIEF DESCRIPTION OF THE DRAWINGS

To describe the technical solutions in the embodiments of the present invention more clearly, the accompanying drawings required for describing the embodiments are briefly described below. The accompanying drawings in the following description are merely some embodiments of the present invention, and those of ordinary skill in the art would also be able to derive other drawings from these drawings without making creative efforts.

The present invention will be further illustrated below in conjunction with the accompanying drawings and embodiments.

DETAILED DESCRIPTION OF THE EMBODIMENTS

Figure 1:
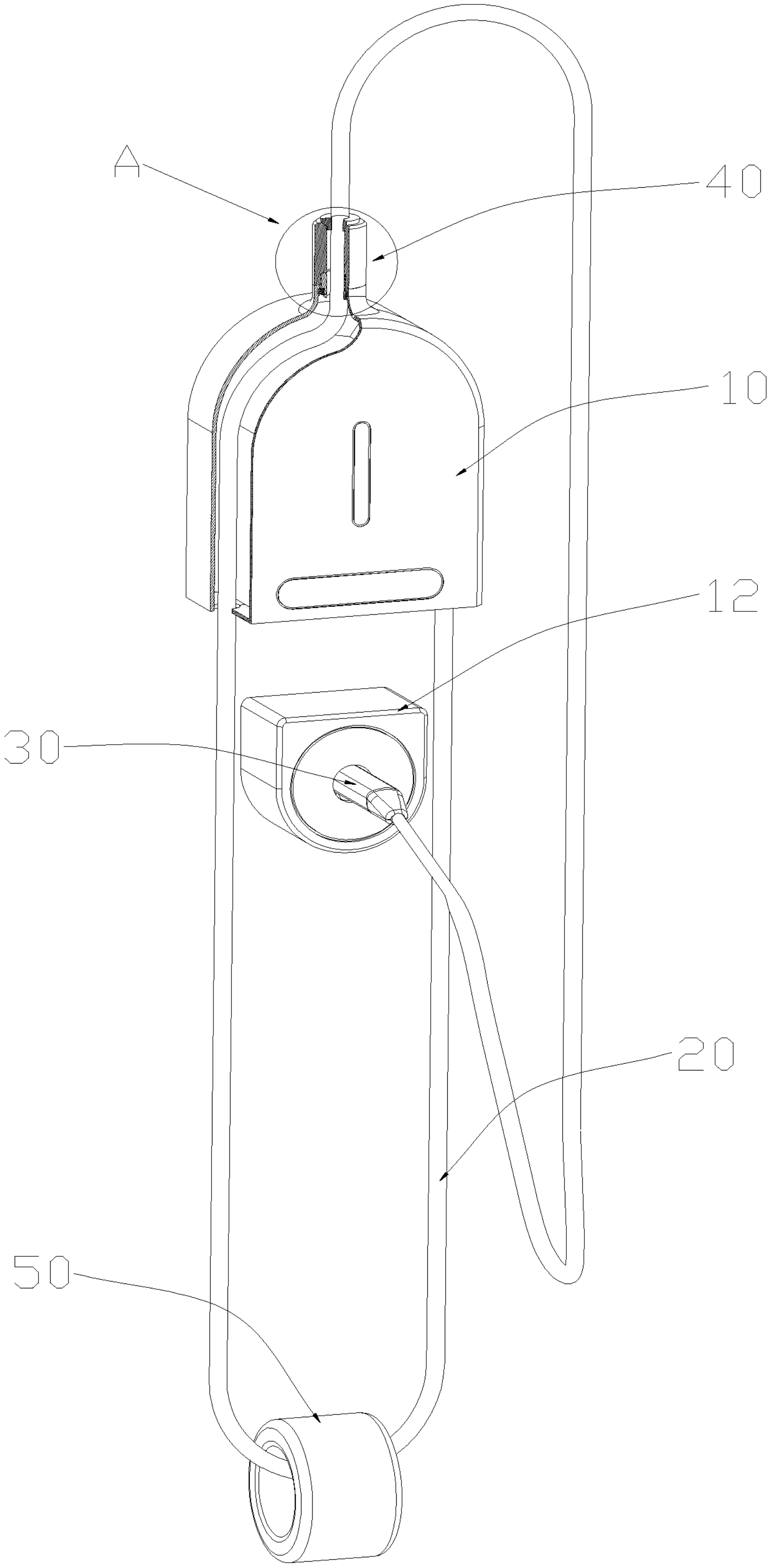
FIG. 1 is a schematic diagram of a partial sectional structure of a charging pile of the present invention.
Figure 2:
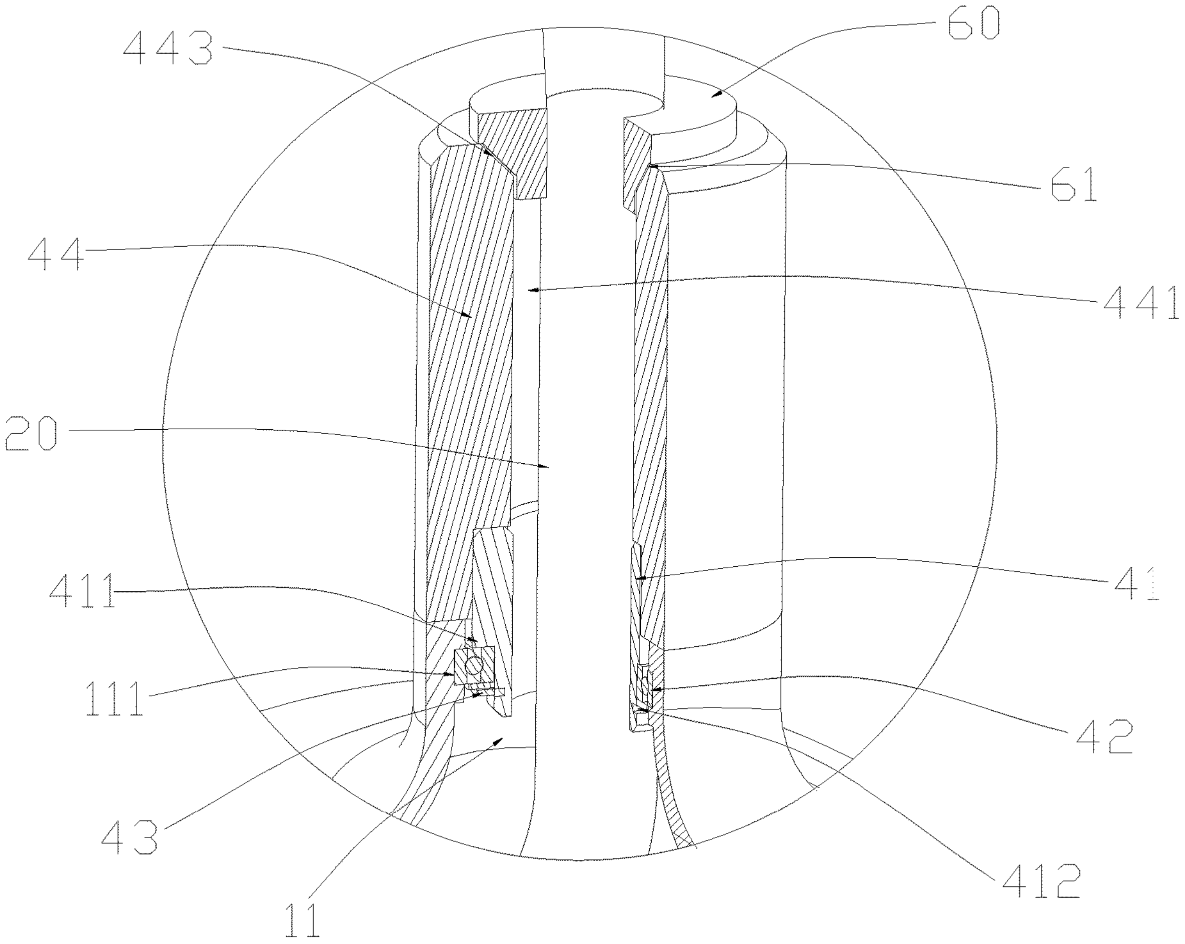
FIG. 2 is an enlarged view of a circle A in FIG. 1.
Figure 3:
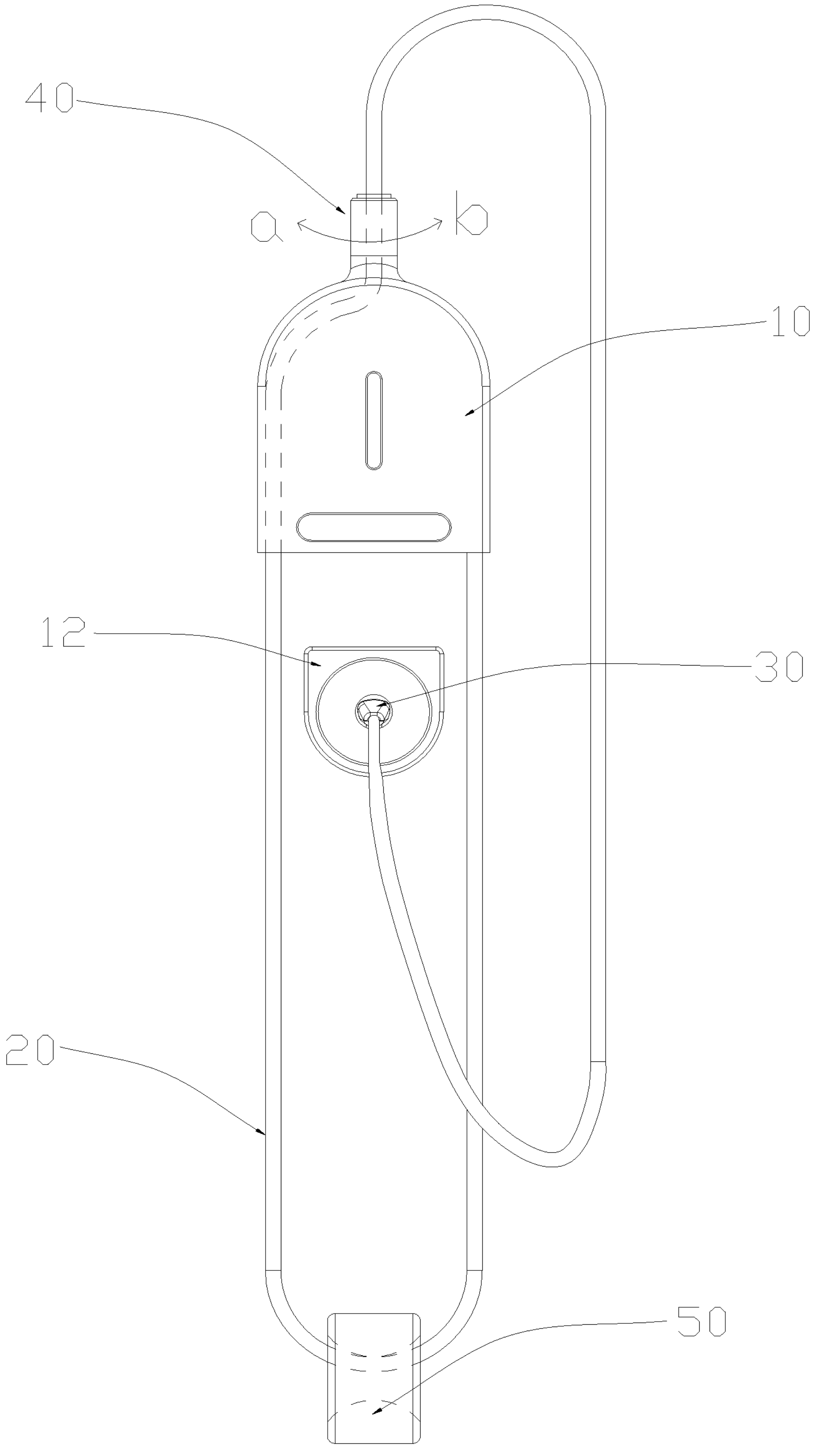
FIG. 3 is a schematic diagram of the rotation direction of a cable adjusting device of the charging pile of the present invention.
Figure 4:
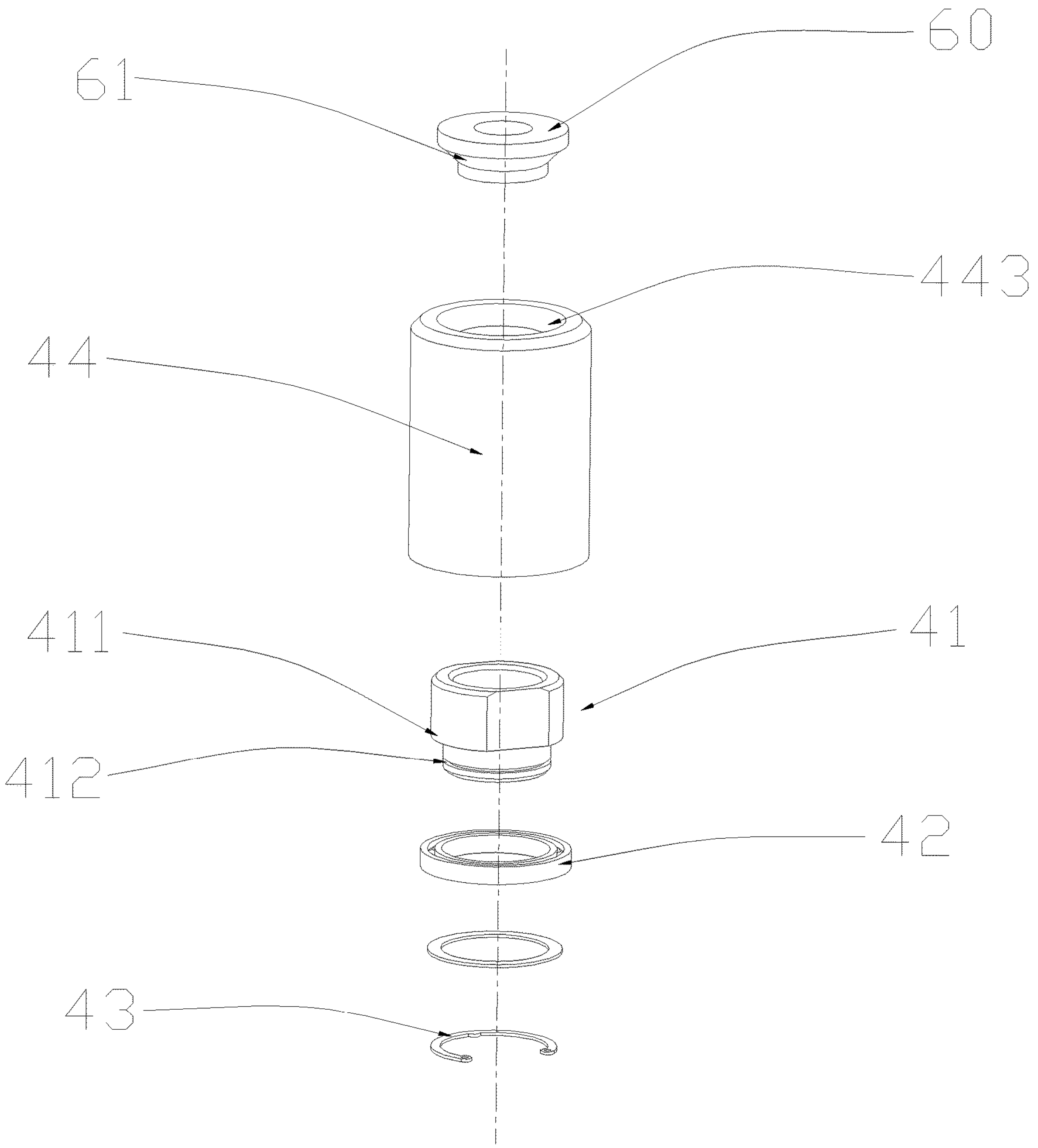
FIG. 4 is a schematic diagram of the explosive structure of the cable adjusting device of the charging pile of the present invention.
Figure 5:
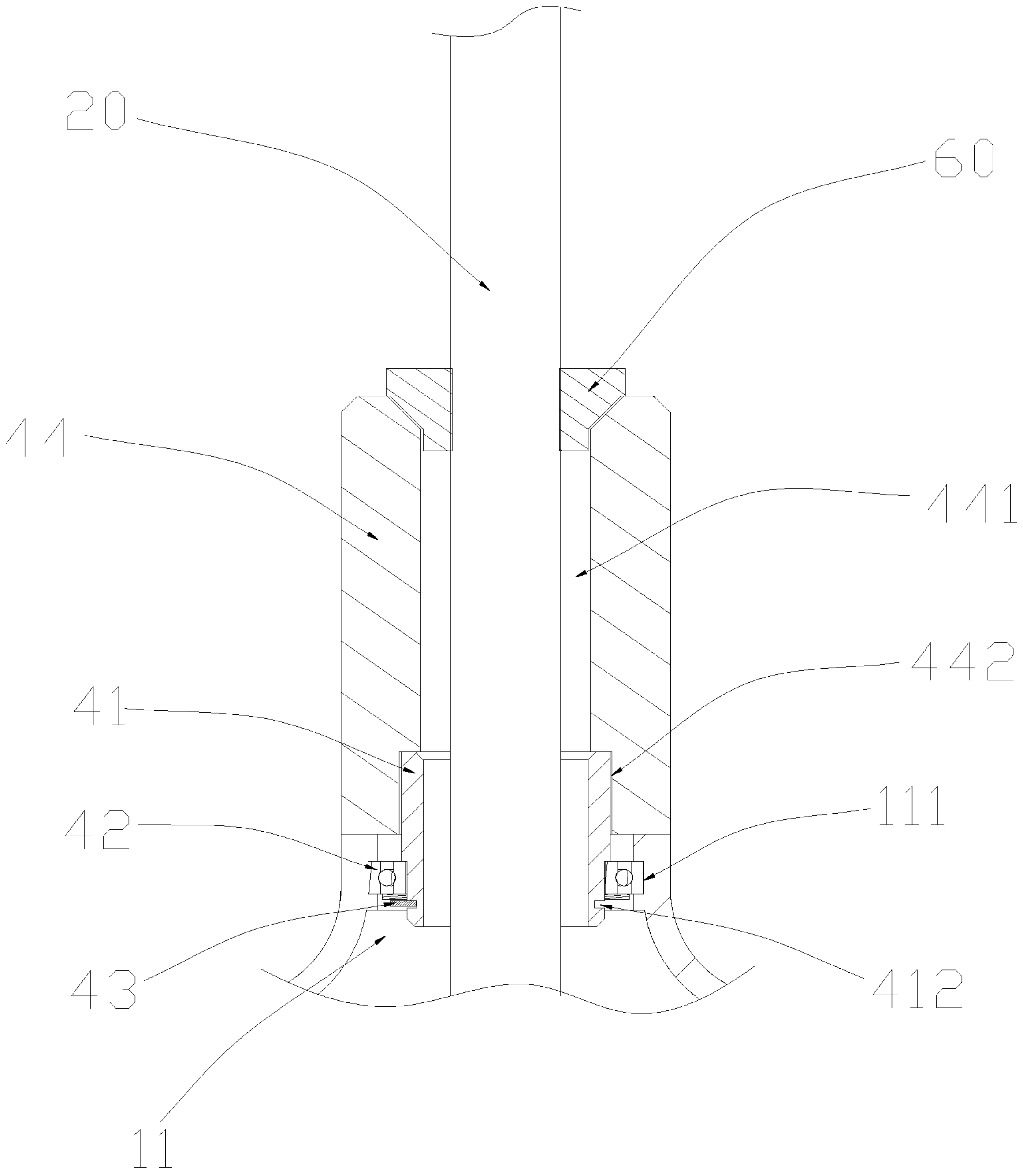
FIG. 5 is a cross-sectional view of the cable adjusting device of the charging pile according to a first embodiment of the present invention.
Figure 6:
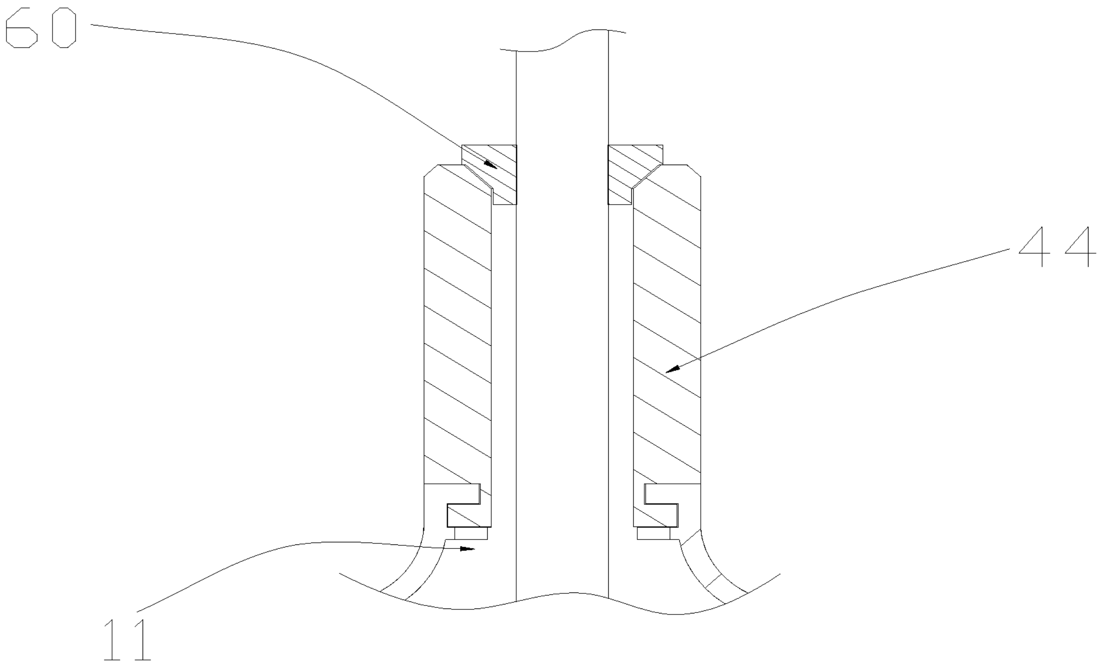
FIG. 6 is a cross-sectional view of the cable adjusting device of the charging pile according to a second embodiment of the present invention.
Figure 7:
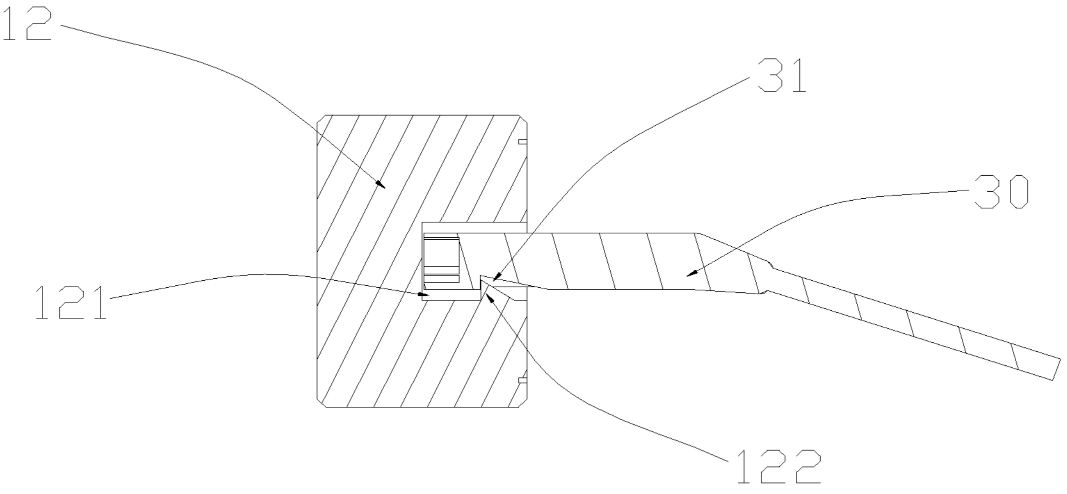
FIG. 7 is a cross-sectional view of a charging gun and a charging gun storage device of the charging pile of the present invention.
Figure 8:
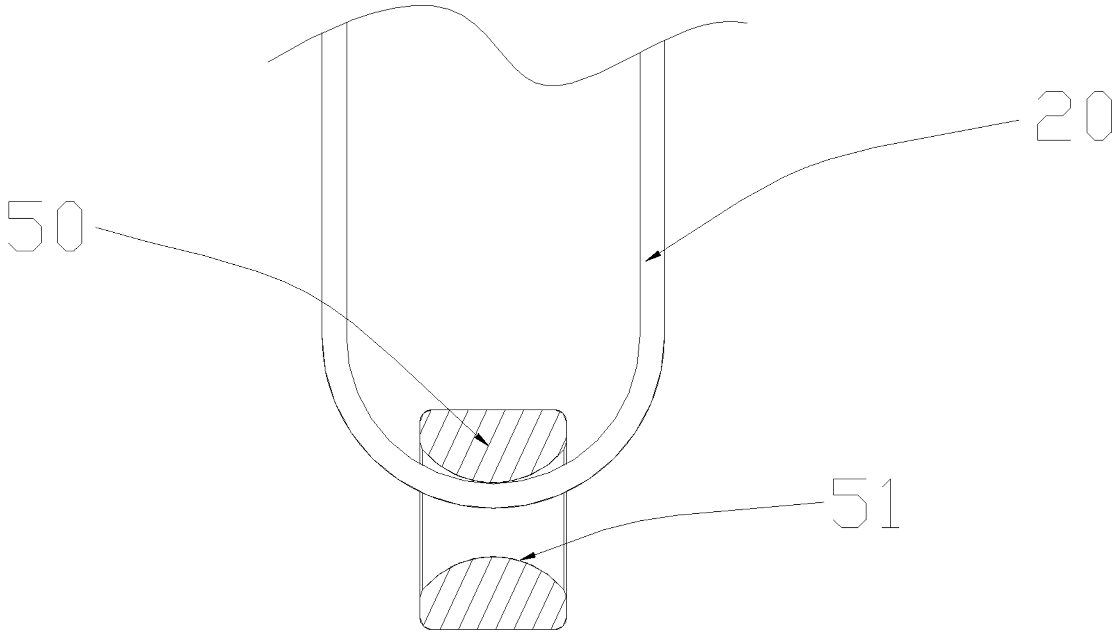
FIG. 8 is a cross-sectional view of a charging cable and a counterweight slider of the charging pile of the present invention.
Figure 9:
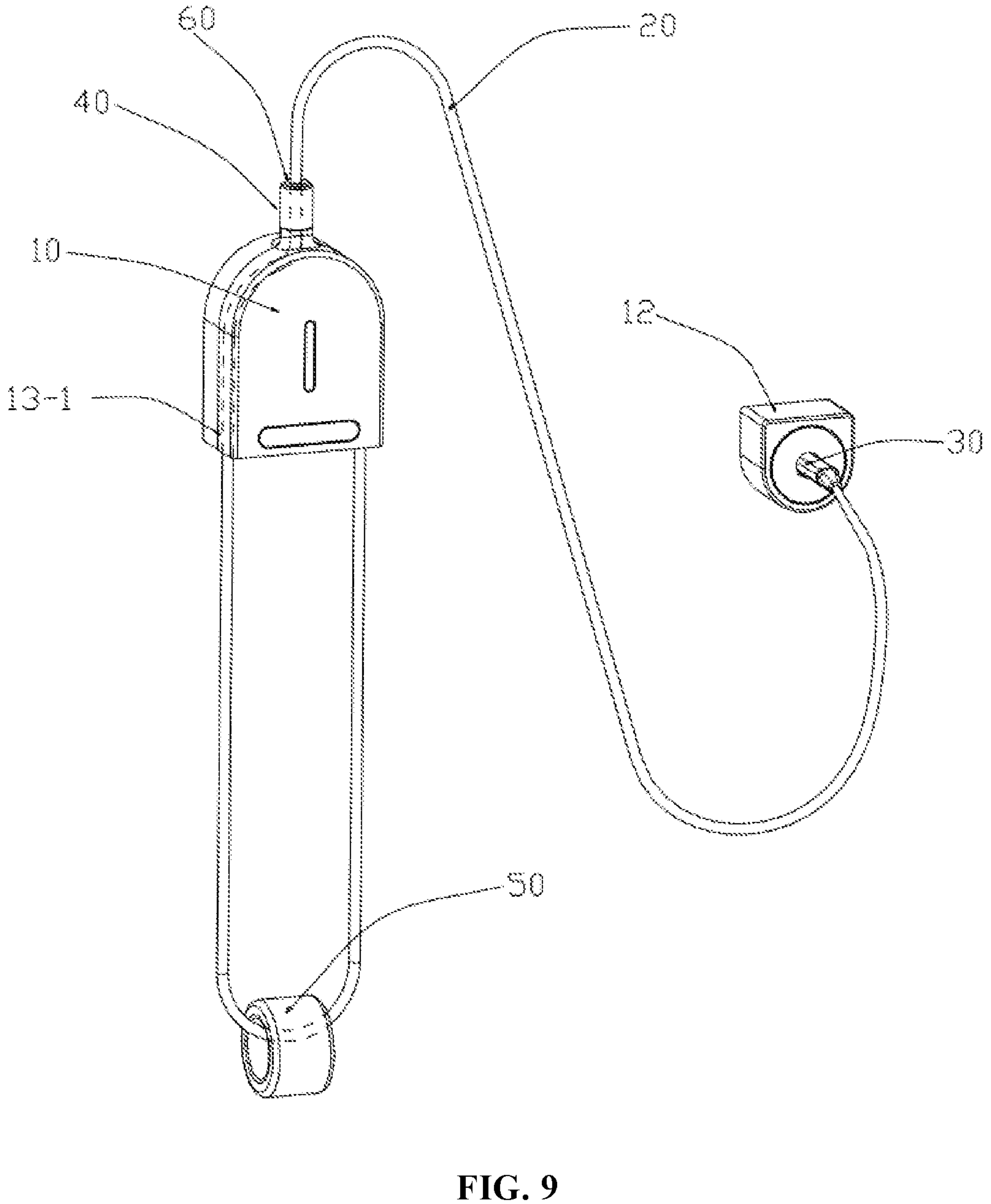
FIG. 9 is a schematic diagram of wiring of the charging cable of the charging pile of the present invention.
Figure 10:
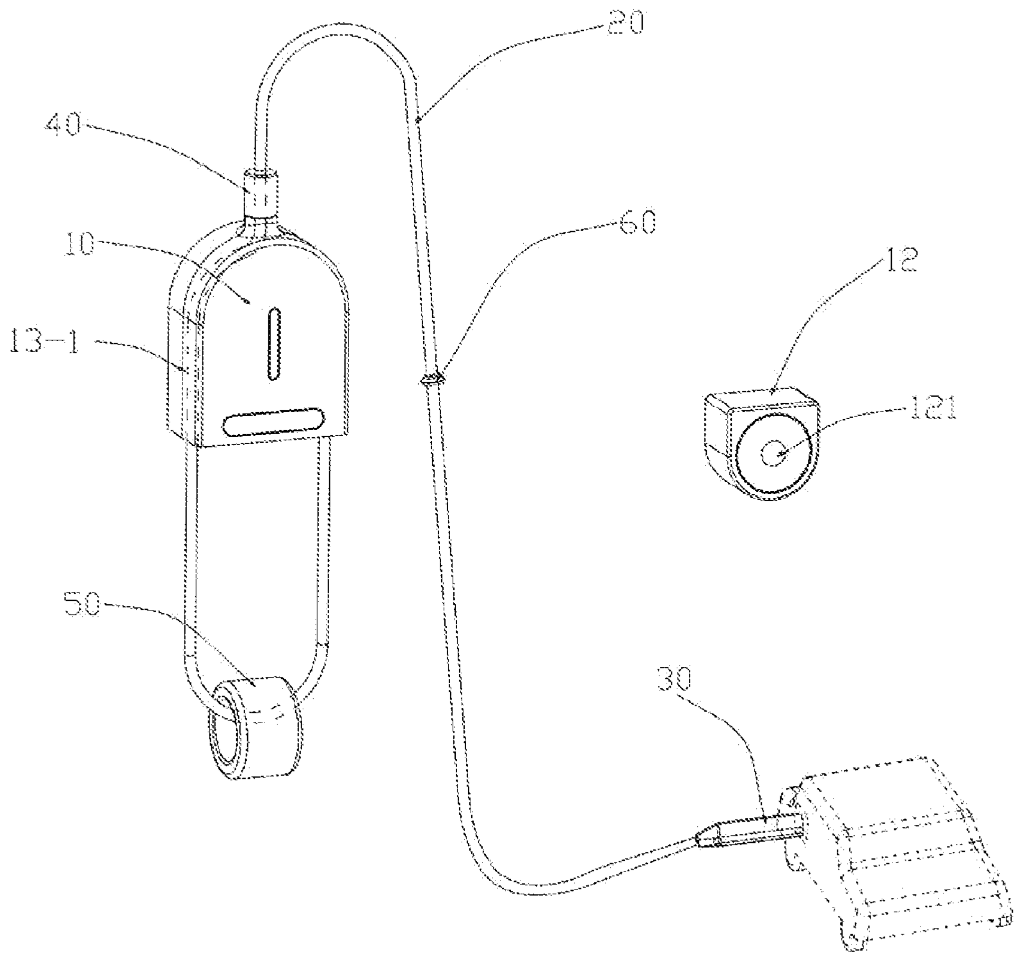
FIG. 10 is a reference diagram of the usage state of the charging pile of the present invention.
Figure 11:
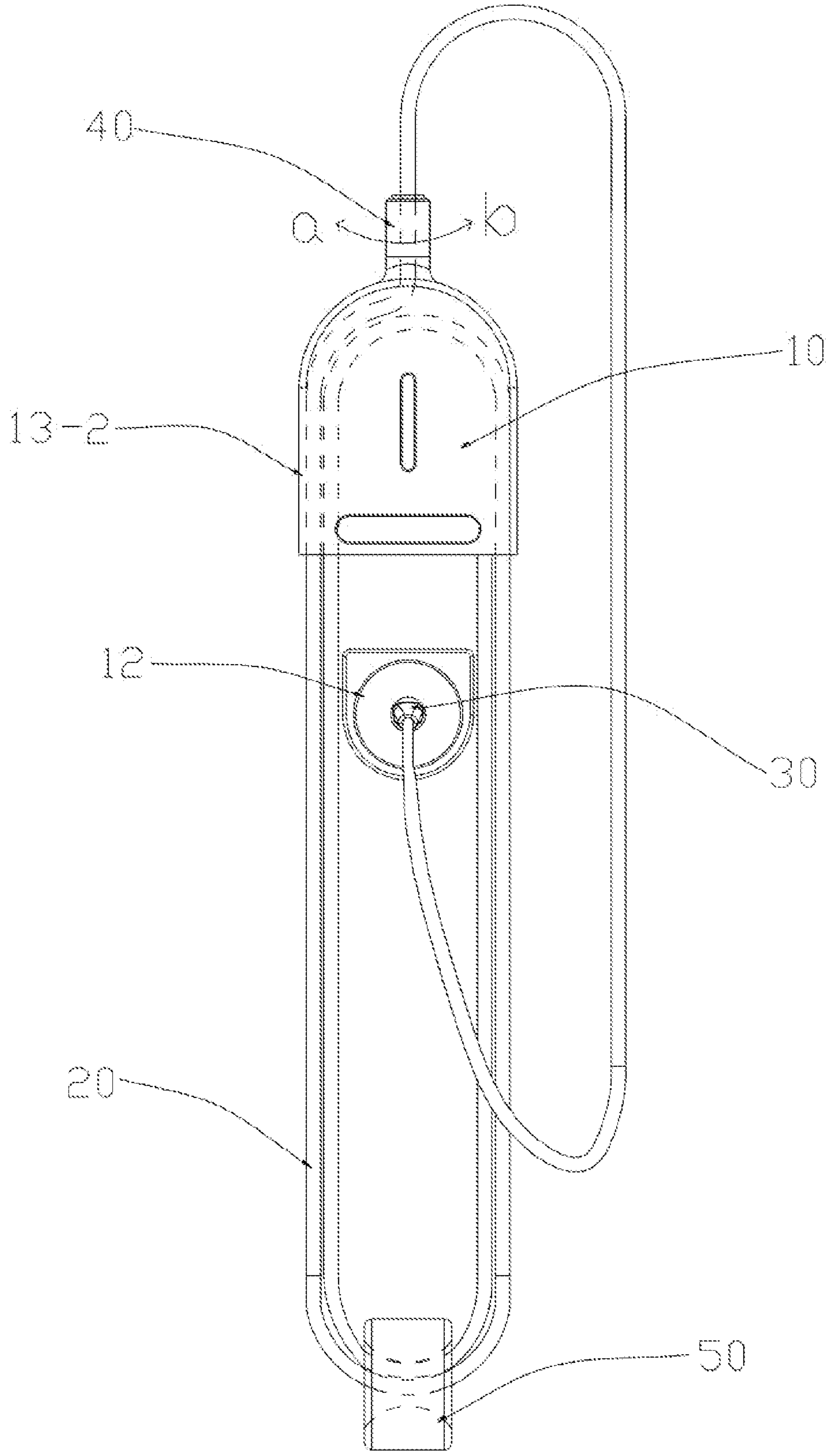
FIG. 11 is a schematic diagram of the wiring of the charging cable of the charging pile according to a third embodiment of the present invention.
Figure 12:
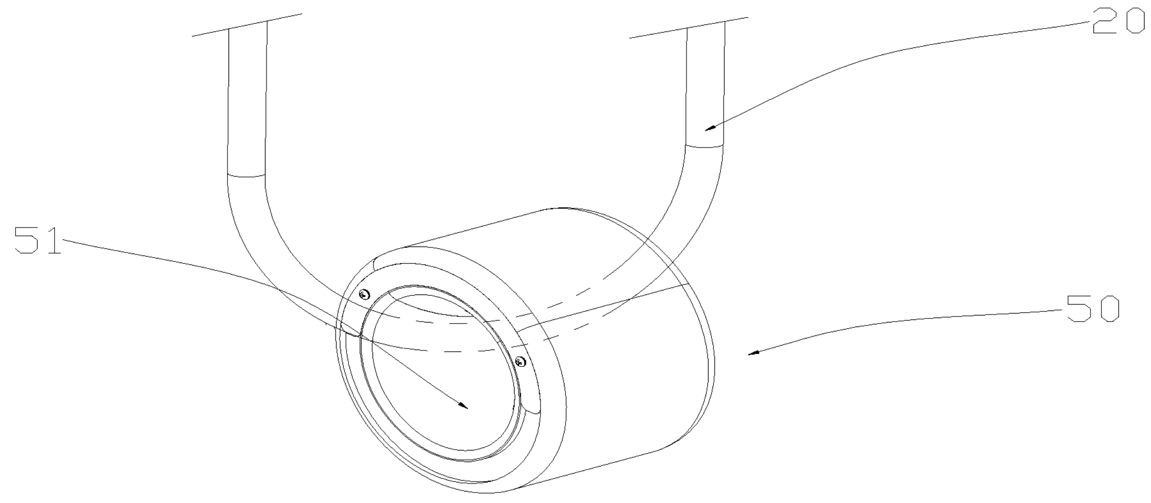
FIG. 12 is a partial view of the cable adjusting device of the charging pile according to a fourth embodiment of the present invention.
Figure 13:
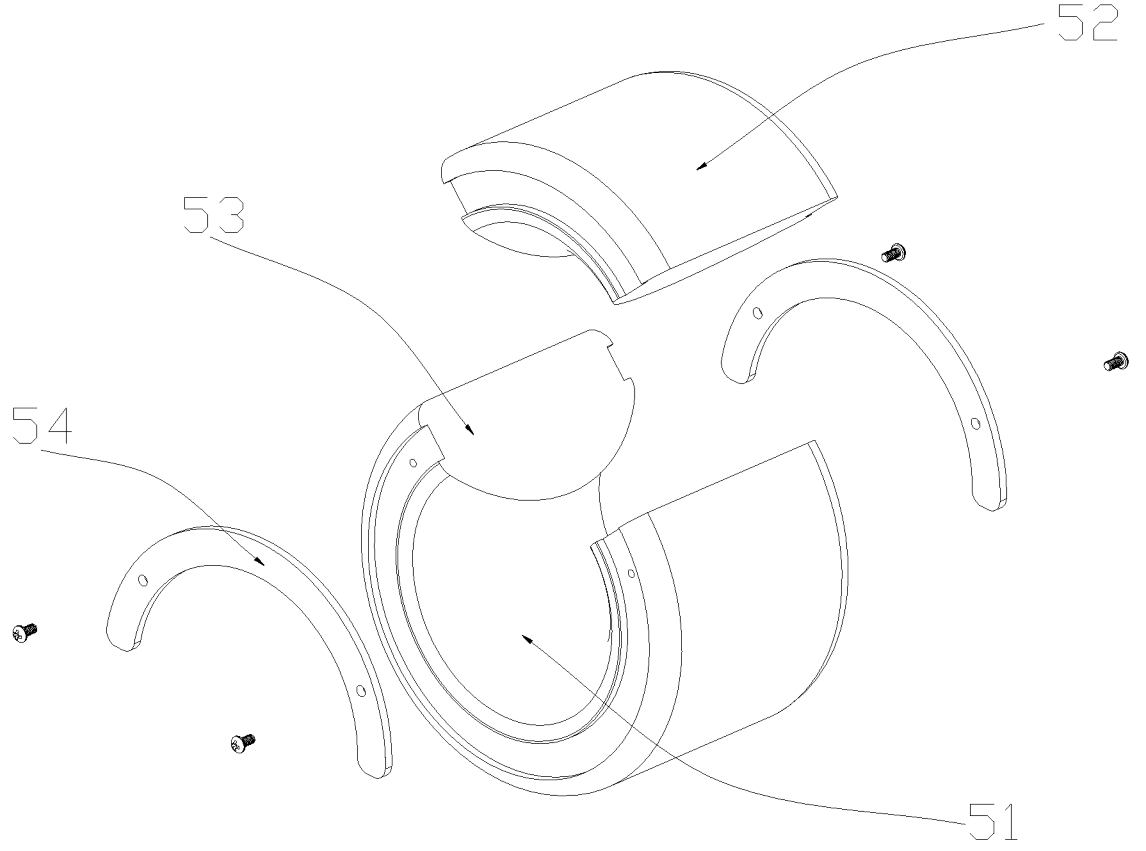
FIG. 13 is an explosive view of the counterweight slider of the charging pile according to another embodiment of the present invention.

With reference to FIGS. 1-13, a charging pile with an adjustable charging cable includes:

- a charging pile body 10, which is provided with a cable outlet 11;
- a charging cable 20, where a first end of the charging cable 20 is connected to the charging pile body 10, a second end of the charging cable 20 penetrates the cable outlet 11, and the charging cable 20 can stretch out or retract through the cable outlet 11;
- a charging gun 30, which is connected to the second end of the charging cable 20; and
- a cable adjusting device 40, where the cable adjusting device 40 is arranged at the cable outlet 11, and when the charging cable 20 stretches out or retracts through the cable outlet 11, the cable adjusting device 40 is configured for eliminating the torsional force of the charging cable 20.

Through the setting of the above structure, an electric vehicle can be charged after picking up the charging gun, pulling the charging cable and inserting the charging gun into the charging port of the electric vehicle; however, when the charging cable is pulled, the impact on the charging cable is not uniform along the axial direction of the charging cable, so under normal circumstances, when the charging cable is pulled, the charging cable usually will be twisted along the circumferential direction, so that a torsional force is generated; after charging, the charging cable is retracted along the cable outlet, and the charging gun is relocated to the charging gun storage device, which can effectively store and rearrange the charging cable and ensure the stability of the product; and when the charging cable is stretched out or retracted through the cable outlet, the charging cable will rotate along the circumferential direction in most cases to generate a torsional force, and the cable adjusting device is arranged at the cable outlet, and is capable to rotate as the charging cable rotates along the circumferential direction, so that the torsional force of the charging cable is eliminated, the friction between the charging cable and the cable outlet is reduced, the charging cable is effectively protected, and the service life and safety of the product are enhanced.

In this embodiment, the cable adjusting device 40 includes a first rotating member 41 and a bearing 42, where the bearing 42 is sleeved on the first rotating member 41, the inner wall of the cable outlet 11 is provided with a containing groove 111, and the outer disc of the bearing 42 is arranged in the containing groove 111. According to the setting of the above structure, the inner disc of the bearing is sleeved on the surface of the first rotating member, and the outer disc of the bearing is arranged in the containing groove, resulting in that the first rotating member can rotate along the bearing in the circumferential direction, and the first rotating member can rotate with the charging cable, so that the charging cable is protected, wear and tear caused by the circumferential rotation of the charging cable are reduced, and the service life of the product can be effectively prolonged.

In this embodiment, the cable adjusting device 40 further includes a snap ring 43, the outer surface of the first rotating member 41 is provided with a boss 411 and a slot 412, the snap ring 43 is snapped into the slot 412, when the bearing 42 is sleeved on the first rotating member 41, the boss 411 abuts against the upper surface of the bearing 42, and the snap ring 43 abuts against the lower surface of the bearing 42. According to the setting of the above structure, the bearing is sleeved on the first rotating member, at this time, the upper surface of the bearing abuts against the boss, the snap ring is snapped into the slot, and at this time, the lower surface of the bearing abuts against the surface of the snap ring. Through the combination of the boss and the snap ring, it is possible to effectively fix the bearing, improve the stability of the product, and facilitate the assembly of the product by the user.

In this embodiment, the cable adjusting device 40 further includes a second rotating member 44, the second rotating member 44 is connected to the first rotating member 41, and the edge of the second rotating member 44 is slidably abutted against the edge of the cable outlet 11. According to the setting of the above structure, the second rotating member is connected to the first rotating member and is capable to rotate with the first rotating member, and the direct contact area between the second rotating member and the charging cable is larger, so that the pressure on the charging cable per unit area is effectively reduced, the charging cable is protected, and the service life of the charging cable is prolonged.

In this embodiment, the second rotating member 44 is provided with a containing channel 441, the inner wall of the containing channel 441 is provided with a containing groove 442, and the containing groove 442 is configured for containing the first rotating member 41. According to the setting of the above structure, the containing channel allows the charging cable to pass through it, and facilities the user to stretch the charging cable to charge the electric vehicle; and the containing groove facilitates the user to install the second rotating member on the first rotating member, so as to achieve the rapid assembly of the second rotating member, and to increase the assembly speed of the product.

In this embodiment, a counterweight slider 50 is further included, the counterweight slider 50 is sleeved on the charging cable 20, and slides along the surface of the charging cable 20, and there exists a distance between the counterweight slider 50 and the ground. According to the setting of the above structure, when the user pulls the charging gun, the charging cable slides out along the cable outlet, the counterweight slider slides along the surface of the charging cable, and the relative height of the counterweight slider rises; and when the user releases the charging gun after the end of charging, under the action of gravity, the counterweight slider descends in the height and slides along the surface of the charging cable, so that the charging cable is retracted along the cable outlet, automatically stored and rearranged, thereby facilitating the use and effectively prolonging the service life of the product.

In this embodiment, the counterweight slider 50 includes a first counterweight 52, a second counterweight 53, and a connecting member 54, where one end of the connecting member 54 is connected to the first counterweight 52, and the other end of the connecting member 54 is connected to the second counterweight 53, so that the first counterweight 52 is connected to the second counterweight 53 to form a counterweight ring. According to the setting of the above structure, the first counterweight and the second counterweight are detachably connected, and are fixedly connected by means of an arc-shaped connecting member. According to use needs, the user can disassemble the first counterweight and the second counterweight, adjust or put the charging cable into the inner ring of the counterweight ring, which facilities the user's operation, maintenance and replacement of the first counterweight and the second counterweight, effectively prolonging the service life of the product.

In this embodiment, the counterweight slider 50 is a counterweight ring, the inner surface of the counterweight ring is provided with a smooth sliding surface 51, and the sliding surface 51 is engaged with the charging cable 20. Through the setting of the above structure, the arc-shaped smooth sliding surface arranged on the inner surface of the counterweight ring is capable to effectively contact and press the surface of the charging cable, so that the surface of the charging cable is evenly stressed, the friction between the inner surface of the counterweight ring and the surface of the charging cable is reduced when the counterweight ring slides along the surface of the charging cable, the sliding efficiency of the counterweight ring is improved, and the charging cable can be freely stretched out or retracted, thus facilitating the use thereof.

In this embodiment, a wiring channel 13 is provided in the charging pile body 10, the wiring channel 13 is communicated with the cable outlet 11, and the wiring channel 13 is configured to allow the charging cable 20 to pass through. According to the setting of the above structure, the wiring channel is arranged in the charging pile body, which can effectively protect the charging cable and prevent the charging cable from being stained. Preferably, the inner wall of the wiring channel is basically a smooth plane or arc, so that when the charging cable moves in the wiring channel, the friction between the charging cable and the wiring channel becomes smaller, which is convenient for the user to pull out the charging cable, and also allows the charging cable to automatically reset under the action of the counterweight ring.

In this embodiment, the wiring channel 13 has a plurality of arc-shaped channels, and the charging cable 20 extends along the arc-shaped channels, so that the multi-layer charging cable 13 is repeatedly wound and passes through the inner ring of the counterweight ring. According to the setting of the above structure, the charging cable is extended along the arc-shaped channel, so that the entire charging cable forms a multi-layer racetrack-like structure, and a plurality of charging cables pass through the inner ring of the counterweight ring, which can reduce the volume occupied by the charging cable, and increase the length of the charging cable. At the same time, the arc-shaped channel has smooth edges and low friction, which is convenient for the user to pull out the charging cable for charging.

In this embodiment, a limiting member 60 is further included, the limiting member 60 protrudes from the surface of the charging cable 20, and when the charging cable 20 is retracted to the initial position along the cable outlet 11, the limiting member 60 abuts against the second rotating member 44. According to the setting of the above structure, when the charging gun is pulled, the charging cable is stretched out along the cable outlet, and at this time, the limiting member is disengaged from the second rotating member; when the user releases the charging gun, the charging cable is automatically reset, and when the charging cable is retracted to the initial position, the limiting member abuts against the second rotating member, which can effectively limit the charging cable, prevent the charging cable from retracting too much, and ensure the length of the charging cable outside the cable outlet, so that the charging gun can be inserted into the charging gun storage device.

In this embodiment, the containing channel 441 is provided with an inclined first abutment surface 443, the limiting member 60 is provided with an inclined second abutment surface 61, and when the charging cable 20 is retracted to the initial position along the cable outlet 11, the second abutment surface 61 abuts against the first abutment surface 443. According to the setting of the above structure, when the charging cable is automatically reset and retracted to the initial position, the second abutment surface abuts against the first abutment surface, and the inclined second abutment surface and the inclined first abutment surface are matched, which can increase the contact area between the limiting member and the second rotating member, and accurately position the limiting member, so that the contact between the limiting member and the second rotating member is stable, and the stability of the product is ensured.

In this embodiment, a charging gun storage device 12 is further included, the charging gun storage device 12 is provided with an insertion port 121, and the charging gun 30 is detachably inserted into the insertion port 121. According to the setting of the above structure, the charging gun is inserted into the insertion port, which is convenient for the user to store or take the charging gun. The present invention features easy use, and a simple and reasonable design.

In this embodiment, a clamping block 122 is arranged in the insertion port 121, the surface of the charging gun 30 is provided with a clamping slot 31, and when the charging gun 30 is inserted into the insertion port 121, the clamping block 122 is snapped into the clamping slot 31. According to the setting of the above structure, when the charging gun is inserted into the insertion port, the clamping block is snapped into the clamping slot, which can effectively limit the charging gun, prevent the charging chamber from falling off, and improve the stability of the product.

The foregoing is merely one or more implementations provided in combination with specific contents, and it is not construed that the specific implementations of the present invention are only limited to these descriptions. Any proximity or similarity to the method and structure of the present invention, or some technical deduction or replacement based on the concept of the present invention shall be deemed to fall within the protection scope of the present invention.

The invention claimed is:

1. A charging pile with an adjustable charging cable, comprising:

a charging pile body (10), which is provided with a cable outlet (11);

a charging cable (20), wherein a first end of the charging cable (20) is connected to the charging pile body (10), a second end of the charging cable (20) penetrates the cable outlet (11), and the charging cable (20) can stretch out or retract through the cable outlet (11);

a charging gun (30), which is connected to the second end of the charging cable (20); and a cable adjusting device (40), wherein the cable adjusting device (40) is arranged at the cable outlet (11), and when the charging cable (20) stretches out or retracts through the cable outlet (11), the cable adjusting device (40) is configured for eliminating the torsional force of the charging cable (20);

wherein the cable adjusting device (40) comprises a first rotating member (41) and a bearing (42), wherein the bearing (42) is sleeved on the first rotating member (41), the inner wall of the cable outlet (11) is provided with a containing groove (111), and the outer disc of the bearing (42) is arranged in the containing groove (111).

2. The charging pile with an adjustable charging cable according to claim 1, wherein the cable adjusting device (40) further comprises a snap ring (43), the outer surface of the first rotating member (41) is provided with a boss (411) and a slot (412), the snap ring (43) is snapped into the slot (412), when the bearing (42) is sleeved on the first rotating member (41), the boss (411) abuts against the upper surface of the bearing (42), and the snap ring (43) abuts against the lower surface of the bearing (42).

3. The charging pile with an adjustable charging cable according to claim 1, wherein the cable adjusting device (40) further comprises a second rotating member (44), the second rotating member (44) is connected to the first rotating member (41), and the edge of the second rotating member (44) is slidably abutted against the edge of the cable outlet (11).

4. The charging pile with an adjustable charging cable according to claim 3, wherein the second rotating member (44) is provided with a containing channel (441), the inner wall of the containing channel (441) is provided with a containing groove (442), and the containing groove (442) is configured for containing the first rotating member (41).

5. A charging pile with an adjustable charging cable, comprising:

a charging pile body (10), which is provided with a cable outlet (11);

a charging cable (20), wherein a first end of the charging cable (20) is connected to the charging pile body (10), a second end of the charging cable (20) penetrates the cable outlet (11), and the charging cable (20) can stretch out or retract through the cable outlet (11);

a charging gun (30), which is connected to the second end of the charging cable (20); and a cable adjusting device (40), wherein the cable adjusting device (40) is arranged at the cable outlet (11), and when the charging cable (20) stretches out or retracts through the cable outlet (11), the cable adjusting device (40) is configured for eliminating the torsional force of the charging cable (20);

wherein a counterweight slider (50) is further comprised, the counterweight slider (50) is sleeved on the charging cable (20), and slides along the surface of the charging cable (20), and there exists a distance between the counterweight slider (50) and the ground;

wherein the counterweight slider (50) comprises a first counterweight (52), a second counterweight (53), and a connecting member (54), where one end of the connecting member (54) is connected to the first counterweight (52), and the other end of the connecting member (54) is connected to the second counterweight (53), so that the first counterweight (52) is connected to the second counterweight (53) to form a counterweight ring.

6. The charging pile with an adjustable charging cable according to claim 5, wherein a wiring channel (13-1) is provided in the charging pile body (10), the wiring channel (13-1) is communicated with the cable outlet (11), and the wiring channel (13-1) is configured to allow the charging cable (20) to pass through.

7. The charging pile with an adjustable charging cable according to claim 6, wherein the wiring channel (13-1) has a plurality of arc-shaped channels, and the charging cable (20) extends along the arc-shaped channels, so that the multi-layer charging cable (13-2) is repeatedly wound and passes through the inner ring of the counterweight ring.

8. The charging pile with an adjustable charging cable according to claim 4, wherein a limiting member (60) is further comprised, the limiting member (60) protrudes from the surface of the charging cable (20), and when the charging cable (20) is retracted to the initial position along the cable outlet (11), the limiting member (60) abuts against the second rotating member (44).

* * * * *